US008264645B2

(12) United States Patent
Jepsen (10) Patent No.: US 8,264,645 B2
(45) Date of Patent: Sep. 11, 2012

(54) TRANSFLECTIVE DISPLAY (75) Inventor: Mary Lou Jepsen, Sausalito, CA (US)

(73) Assignee: Pixel Qi Corporation, San Bruno, CA (US)

( * ) Notice: Subject to any disclaimer, the term of this patent is extended or adjusted under 35 U.S.C. 154(b) by 447 days.

(21) Appl. No.: 12/503,793

(22) Filed: Jul. 15, 2009

(65) Prior Publication Data

US 2010/0014032 A1    Jan. 21, 2010

Related U.S. Application Data (60) Provisional application No. 61/081,076, filed on Jul. 16, 2008.

(51) Int. Cl.
G02F 1/1335 (2006.01)

(52) U.S. Cl. ......................................... 349/114; 349/106
(58) Field of Classification Search .................. None
See application file for complete search history.

(56) References Cited

U.S. PATENT DOCUMENTS

| 5,748,828 | A  | * | 5/1998  | Steiner et al. ................. 385/146 |
| 6,341,002 | B1 |   | 1/2002  | Shimizu et al. |
| 6,674,420 | B2 |   | 1/2004  | Matsueda et al. |
| 6,801,274 | B2 |   | 10/2004 | Suzuki |
| 6,920,359 | B2 |   | 7/2005  | Meadows et al. |
| 6,930,664 | B2 | * | 8/2005  | Kim et al. ........................ 345/99 |
| 7,008,409 | B2 |   | 3/2006  | Spiezio et al. |
| 7,030,946 | B2 |   | 4/2006  | Iijima et al. |
| 7,196,766 | B2 | * | 3/2007  | Yang et al. ..................... 349/192 |
| 7,248,315 | B2 | * | 7/2007  | Arai et al. ..................... 349/114 |
| 7,358,943 | B2 |   | 4/2008  | Asao |
| 7,388,635 | B2 |   | 6/2008  | Aoki |
| 7,463,327 | B2 | * | 12/2008 | Tasaka et al. ................. 349/155 |

(Continued)

FOREIGN PATENT DOCUMENTS

JP        2003-248221 A        9/2003

(Continued)

OTHER PUBLICATIONS

Wright et al., "Resolution and Legibility: A Comparison of TFTLCDs and CRTs," SID Symposium Digest of Technical Papers, May 1999, vol. 30 issue 1, pp. 346-349, published by Society for Information Display, Campbell, CA USA.

(Continued)

Primary Examiner — Richard Kim
(74) Attorney, Agent, or Firm — Hickman Palermo Truong Becker Bingham Wong LLP (57) ABSTRACT A multi-mode Liquid Crystal Display (LCD) capable of functioning in a multi-mode, a monochrome reflective mode and a color transmissive mode. One embodiment provides an LCD with color filters only over most or all of the transmissive part of a pixel but only part of the reflective portion of a pixel, enabling readability in the ambient light. Embodiments eliminate the black matrix mask used typically in color filter creation. Additionally, an embodiment provides diagonal pixels to improve the resolution of the LCD in the color transmissive mode. Further, an embodiment enables the light to switch between two colors, while a third color (typically green) is always on, thereby decreasing the required frame rate of the LCD, when used in the hybrid field sequential approach. Yet another embodiment creates colors from the backlight, eliminating the need for color filters. Another embodiment involves use of color filters over only the green pixels, eliminating the need for using additional masks for making the color filter array.

22 Claims, 6 Drawing Sheets

U.S. PATENT DOCUMENTS

| | | | |
|---|---|---|---|
| 7,746,431 | B2 | 6/2010 | Jepsen |
| 2002/0003521 | A1 | 1/2002 | Matsueda et al. |
| 2002/0060657 | A1 | 5/2002 | Matsueda et al. |
| 2002/0145688 | A1 | 10/2002 | Sekiguchi |
| 2002/0154257 | A1 | 10/2002 | Iijima |
| 2004/0201560 | A1 | 10/2004 | Shen et al. |
| 2004/0201814 | A1* | 10/2004 | Yamamoto .................. 349/156 |
| 2004/0252092 | A1 | 12/2004 | Roosendaal |
| 2005/0083453 | A1 | 4/2005 | Nakano et al. |
| 2006/0007194 | A1 | 1/2006 | Verschueren et al. |
| 2006/0044240 | A1 | 3/2006 | Takizawa et al. |
| 2007/0046606 | A1 | 3/2007 | Kim et al. |
| 2007/0085804 | A1 | 4/2007 | Tajiri |
| 2007/0164953 | A1 | 7/2007 | Huang et al. |
| 2007/0242014 | A1 | 10/2007 | Lee et al. |
| 2007/0242197 | A1 | 10/2007 | Watson et al. |
| 2008/0030656 | A1 | 2/2008 | Watson et al. |
| 2008/0074592 | A1 | 3/2008 | Araki et al. |
| 2008/0117346 | A1 | 5/2008 | Jepsen |
| 2008/0284719 | A1 | 11/2008 | Yoshida |
| 2009/0009447 | A1 | 1/2009 | Naka et al. |
| 2011/0025960 | A1 | 2/2011 | Jepsen et al. |

FOREIGN PATENT DOCUMENTS

| | | |
|---|---|---|
| JP | 2004-045757 A | 2/2004 |
| JP | 2004-163893 A | 6/2004 |
| JP | 2004-279765 A | 10/2004 |

OTHER PUBLICATIONS

Yoshitake et al., "The Relationship Between Pixel Density and Readbility on Computer Displays—Effectiveness of an Anti-Aliased Font on a High Density LCD," SID Symposium Digest of Technical Papers, May 2003, vol. 34 issue 1, pp. 296-299, published by Society for Information Display, Campbell, CA USA.

International Searching Authority, "International Search Report and Written Opinion", application No. PCT/US2009/050787, dated Feb. 17, 2010, 10 pages.

Current Claims, application No. PCT/US2009/050787, 4 pages.

International Searching Authority, "International Search Report and Written Opinion", application No. PCT/US2009/051946, dated Mar. 3, 2010, 15 pages.

Current Claims, application No. PCT/US2009/051946, 11 pages.

International Searching Authority, "International Search Report and Written Opinion", application No. PCT/US2009/051950, dated Mar. 15, 2010, 10 pages.

Current Claims, application No. PCT/US2009/051950, 6 pages.

Wu, S.T., et al., "Mixed-Mode Twisted Nematic Liquid Crystal Cells for Reflective Displays", Applied Physics Letters, vol. 68, published Jan. 1996, 3.

Wright, et al., "Resolution and Legibility: A comparison of TFTLCDs and CRTs", SID Digest, 1999, 4 pages.

Yoshitake, et al., "The Relationship between Pixel Density and Readability on Computer Displays—Effectiveness of an Anti-Aliased Front on a High Density LCD", SID Digest, 2003, 4 pages.

\* cited by examiner

TRANSFLECTIVE DISPLAY

BENEFIT CLAIM

This application claims the benefit, under 35 U.S.C. 119 (e), of prior provisional application 61/081,076, filed Jul. 16, 2008, the entire contents of which is hereby incorporated by reference as if fully set forth herein.

TECHNICAL FIELD

The present disclosure relates, in general, to a display. More specifically, the disclosure relates to a multi-mode Liquid Crystal Display (LCD).

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The increase in the use of displays in various electronic components has increased the pressure on display manufacturers to provide components that provide better performance. The performance parameters include readability, power consumption, resolution, cost, and sunlight readability. Display manufacturers employ various techniques to improve performance based on these parameters.

One such technique is used in transflective LCDs. Each pixel of the transflective LCD has a reflective part and a transmissive part. The transmissive part and the reflective part also comprise sub-pixels. Each of the sub-pixels has color filters that impart color to the pixel. Additionally, each of the sub-pixels is arranged horizontally or vertically. This requires three or more sub-pixels to represent a color in the LCD.

In the above-mentioned approach, color filters are placed over both the transmissive part and the reflective part. Therefore, the light passing through the color filters is attenuated, making the reflective mode, with the backlight off, dim and difficult to read. Further, the backlight, in the transmissive mode, requires more power to achieve a high-resolution display. Further, this practice reduces the resolution when white, black or shades of grey are displayed, as it takes multiple color subpixels to represent a shade of neutral grey, or white. Text is most often depicted in black, white and grey and higher resolution text has been shown to dramatically improve readability and legibility. See, for example, Steven L. Wright, Ian L. Bailey, Kuang-Mon Tuan, Richard T. Wacker, "Resolution and Legibility: A comparison of TFTLCDs and CRTs" SID Digest, 24-03, 1999; Yoshitake, Ryoji and Kubota, Satoru, "The Relationship between Pixel Density and Readability on Computer Displays—Effectiveness of an Anti-aliased Font on a High Density LCD" SID 2003 Digest, pp 296-299.

In view of the foregoing discussion, there exists a need for a technique that produces a high resolution in LCDs that are roomlight readable with the backlight off, and sunlight readable. Additionally, a need exists to develop an LCD that shows a high resolution in black, white and shades of grey.

SUMMARY

In an embodiment, an LCD provides better resolution and readability as compared to existing LCDs.

In an embodiment, the power required by the LCD is reduced.

In an embodiment, a sunlight readable display in the LCD is provided.

In an embodiment, a roomlight readable display in the LCD is provided.

In an embodiment, an LCD comprises color filters over the transmissive part of a pixel, and color filters only over a portion of the reflective part of the pixel, enabling shifting of the monochrome white-point and a strong readability in ambient light. In an embodiment, the black matrix mask used typically in color filter creation is eliminated. Additionally, an embodiment provides diagonal pixels to improve the resolution of the LCD in the color transmissive mode. Further, an embodiment enables the light to switch between two colors, while a third color (typically green) is always on, thereby, decreasing the required frame rate of the LCD, when used in the hybrid field sequential approach. In an embodiment, colors are created from the backlight, thereby eliminating the need for color filters. In an embodiment, color filters are used over only the green pixels, thereby eliminating the need for using additional masks for making the color filter array.

In an embodiment, a multi-mode Liquid Crystal Display comprises a light source for illuminating the multi-mode display; a first polarizer for aligning the plane of polarization of light from the light source to a first plane; a second polarizer for aligning the plane of polarization of the light from the light source to a pre-defined second plane; a first substrate and a second substrate, the first substrate and the second substrate being interposed between the first polarizer and the second polarizer; and a plurality of pixels, each of the plurality of pixels being positioned at the first substrate, each of the plurality of pixels comprising a reflective part and a transmissive part, wherein the reflective part has only part of a color filter, and at least part of the transmissive part comprises one or more color-filters that mostly or completely cover the transmissive part of the pixel.

In an embodiment, the reflective part occupies opposite corners of the plurality of pixels. In an embodiment, the color filter associated with the reflective part of the pixel creates a monochrome white point for the entire pixel. In an embodiment, the transmissive part occupies a center of the plurality of pixels. In an embodiment, a spectrum of color is generated from the light from the light source using a diffractive or a micro-optical film.

In an embodiment, the transmissive part is diagonally arranged. In an embodiment, the one or more color-filters are of different thicknesses. In an embodiment, the one or more color-filters are of a same thickness.

In an embodiment, the multi-mode Liquid Crystal Display further comprises one or more colorless spacers placed over the reflective part. In an embodiment, the one or more colorless spacers are of a same thickness. In an embodiment, the one or more colorless spacers are of different thicknesses.

In an embodiment, the multi-mode Liquid Crystal Display further comprises a driver circuit to provide pixel values to a plurality of switching elements, wherein the plurality of switching elements determines the light transmitting through the transmissive part. In an embodiment, the driver circuit further comprises a Transistor-Transistor-Logic interface. In an embodiment, the multi-mode Liquid Crystal Display further comprises a timing control circuit to refresh the pixel values of the multi-mode Liquid Crystal Display.

In an embodiment, the multi-mode Liquid Crystal Display as described herein forms a part of a computer, including but not limited to a laptop computer, notebook computer, and netbook computer.

BRIEF DESCRIPTION OF THE DRAWINGS

Various embodiments of the present invention will hereinafter be described in conjunction with the appended drawings, provided to illustrate and not to limit the present invention, wherein like designations denote like elements, and in which.

DETAILED DESCRIPTION

Various embodiments of the present invention relate to a Liquid Crystal Display (LCD) that is capable of functioning in multi-mode, a monochrome reflective mode and a color transmissive mode. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
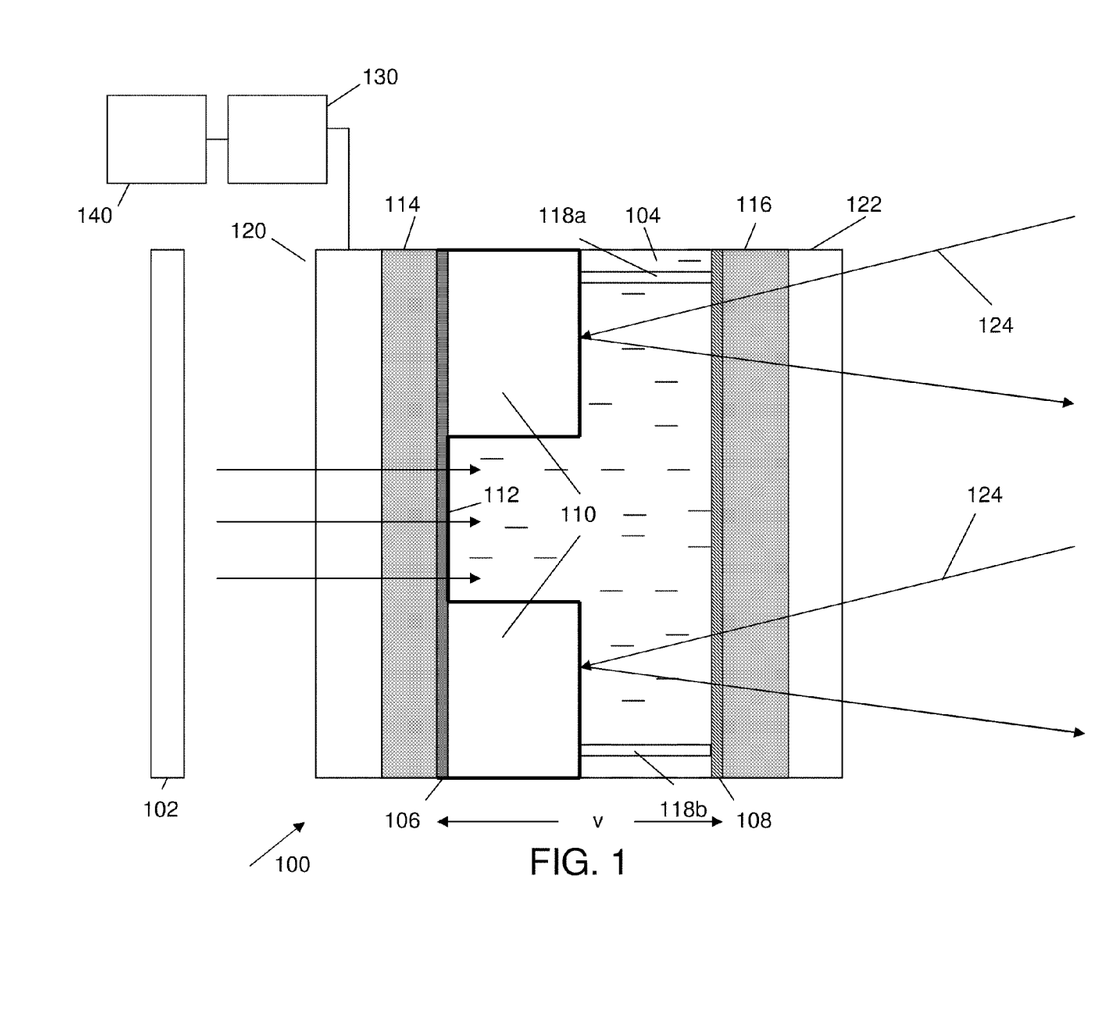
FIG. 1 is a schematic of a cross section of a pixel of a LCD.

FIG. 1 is a schematic of a cross section of a pixel 100 of a LCD. Pixel 100 comprises a liquid crystal material 104, a pixel electrode 106, a common electrode 108, a reflective part 110, a transmissive part 112, substrates 114 and 116, spacers 118*a* and 118*b*, a first polarizer 120, and a second polarizer 122. In an embodiment, a light source 102 or an ambient light 124 illuminates pixel 100. Examples of light source 102 include, but are not limited to, Light Emitting Diodes backlights (LEDs), Cold-Cathode Fluorescent Lamps backlights (CCFLs), and the like. Ambient light 124 can be sunlight or any external source of light. In an embodiment, liquid crystal material 104, which is an optically active material, rotates the axis of the polarization of the light from light source 102 or ambient light 124. Liquid crystal 104 can be a Twisted Nematic (TN), an Electrically Controlled Birefringence (ECB) and the like. In an embodiment, the rotation of the plane of the light is determined by the potential difference applied between pixel electrode 106, and common electrode 108. In an embodiment, pixel electrode 106 and common electrode 108 can be made of Indium Tin Oxide (ITO). Further, each pixel is provided with a pixel electrode 106, while common electrode 108 is common to all the pixels present in the LCD.

In an embodiment, reflective part 110 is electrically conductive and reflects ambient light 124 to illuminate pixel 100. Reflective part 110 is made of metal and is electrically coupled to pixel electrode 106 thereby providing the potential difference between reflective part 110 and common electrode 108. Transmissive part 112 transmits light from light source 102 to illuminate pixel 100. Substrates 114 and 116 enclose liquid crystal material 104, pixel electrode 106 and common electrode 108. In an embodiment, pixel electrode 106 is located at substrate 114, and common electrode 108 is located at substrate 116. Additionally, substrate 114 comprises switching elements (not shown in FIG. 1). In an embodiment, the switching elements can be Thin Film Transistors (TFTs).

Further, a driver circuit 130 sends signals related to pixel values to the switching elements. In an embodiment, driver circuit 130 uses low voltage differential signaling (LVDS) drivers. In another embodiment, a transistor-transistor logic (TTL) interface that senses both increase and decrease in voltages is used in driver circuit 130. Additionally, a timing controller 140 encodes the signals related to pixel values into the signals needed by the diagonal transmissive parts of the pixels. Furthermore, timing controller 140 has a memory to allow self-refresh of the LCD when the signals related to the pixels are removed from timing controller 140.

In an embodiment, spacers 118*a* and 118*b* are placed over reflective part 110 to maintain a uniform distance between substrates 114 and 116. Additionally, pixel 100 comprises first polarizer 120 and second polarizer 122. In an embodiment, the axes of polarity of first polarizer 120 and second polarizer 122 are perpendicular to each other. In another embodiment, the axes of polarity of first polarizer 120 and second polarizer 122 are parallel to each other.

Pixel 100 is illuminated by light source 102 or ambient light 124. The intensity of light passing through pixel 100 is determined by the potential difference between pixel electrode 106, and common electrode 108. In an embodiment, liquid crystal material 104 is in a disoriented state and the light passing through first polarizer 120 is blocked by second polarizer 122 when no potential difference is applied between pixel electrode 106, and common electrode 108. Liquid crystal material 104 is oriented when the potential difference is applied between pixel electrode 106, and common electrode 108. The orientation of liquid crystal material 104 allows the light to pass through second polarizer 122.

Figure 2:
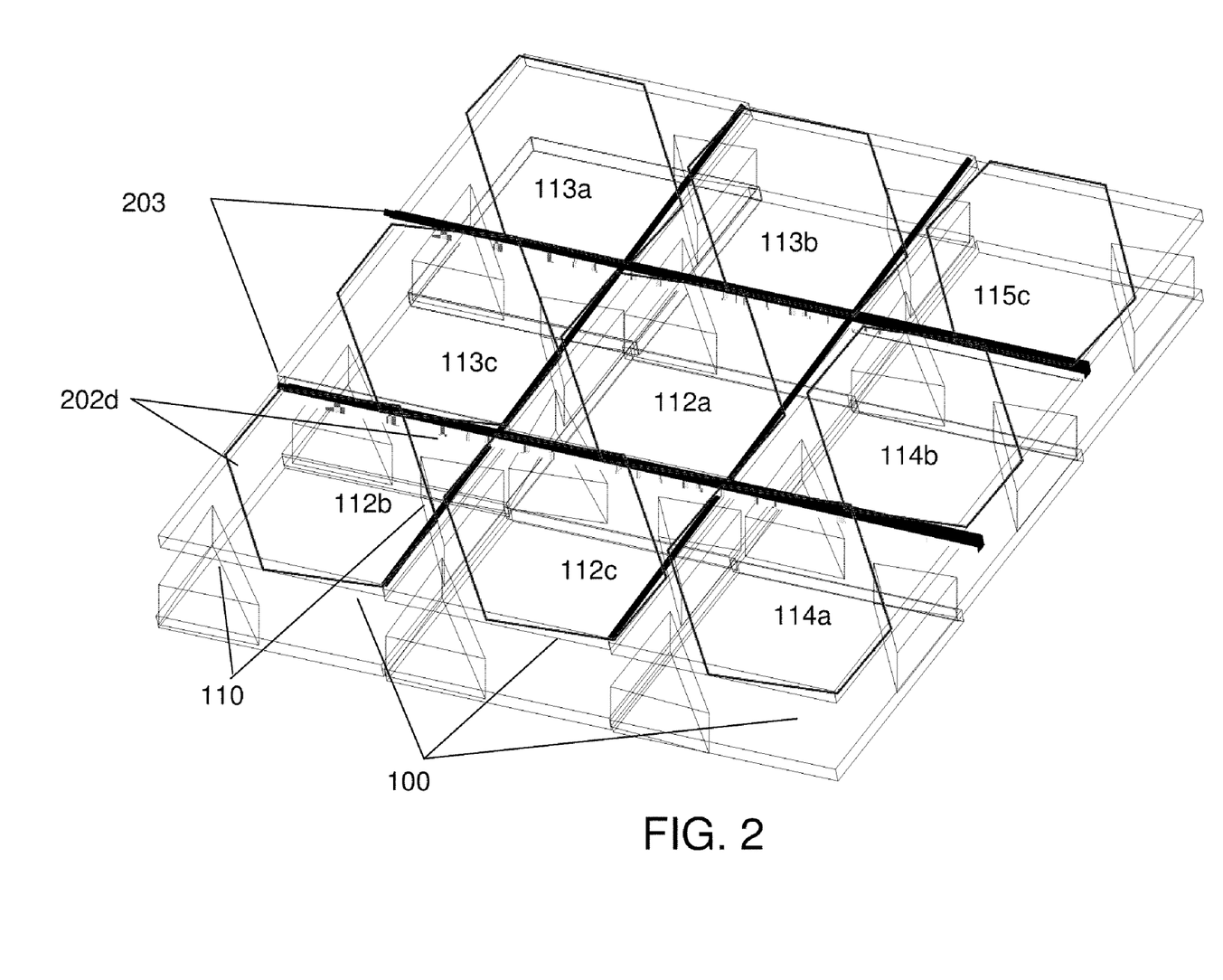
FIG. 2 illustrates the arrangement of nine pixels of the LCD.

FIG. 2 illustrates the arrangement of nine pixels 100 of the LCD, in accordance with an embodiment of the present invention. Pixel 100 comprises transmissive part 112*b* and reflective part 110. In an embodiment, transmissive parts 112*a-c* impart green, blue and red color components respectively to form a color pixel, if the (Red-Blue-Green) RBG color system is followed. Additionally, transmissive parts 112*a-c* can impart different colors such as red, green, blue and white or other color combinations, if other color systems are chosen. Furthermore, transmissive part 113*a* and 114*a* impart green color, transmissive part 113*b* and 114*b* impart blue color, and transmissive part 113*a* and 114*c* impart red color to the color pixel. Additionally, color filters of different thicknesses can be placed over transmissive parts 112*a-c* to decrease or increase the saturation of the color imparted to the color pixel. Saturation is defined as intensity of a specific gradation of color within the visible spectrum. Further, a colorless filter 202*d* can be placed over reflective part 110. In various embodiments, the thickness of colorless filter 202*d* can vary from zero to the thickness of other color filters placed over transmissive parts 112*a-c*. In an embodiment, transmissive parts 112*a* represent a diagonal strip of one of the three colors of the color pixel. Similarly, transmissive parts 112 *b* and 112*c* represent a diagonal strip of other two colors of the color pixel. The diagonal strips are used so that the resolution in the color transmissive mode can be close to the resolution in the monochrome (black and white) reflective mode. The resolution in color transmissive mode is high because the human visual system can detect horizontal and vertical lines while visualizing images. In another embodiment, vertical stripes of color can be used that change the resolution more in the horizontal direction and less in the vertical direction when compared to the use of diagonal stripes. The amount of light from light source 102 transmitting through each of the transmissive parts 112*a-c* is determined by the switching elements (not shown in FIG. 2). The amount of light transmitting through each transmissive parts 112a-c, in turn, determines the color of the color pixel. Further, the shape of transmissive parts 112a-c and the color filters can be hexagonal, rectangular, octagonal, circular or so forth. Additionally, the shape of reflective part 110 can be rectangular, circular, octagonal, and the like. Further, reflective part 110 blocks light delivered to diagonal stripes from transmitting to pixels of different colors, for example reflective part 110 blocks light along transmissive parts 112c and 113c from entering to transmissive parts 112b or 112a. Alternatively, a black matrix mask 203, a covering between pixels and light sensitive areas of pixels, can be used. In an embodiment, black matrix mask 203 is eliminated to improve the reflectivity of the pixels.

Figure 3:
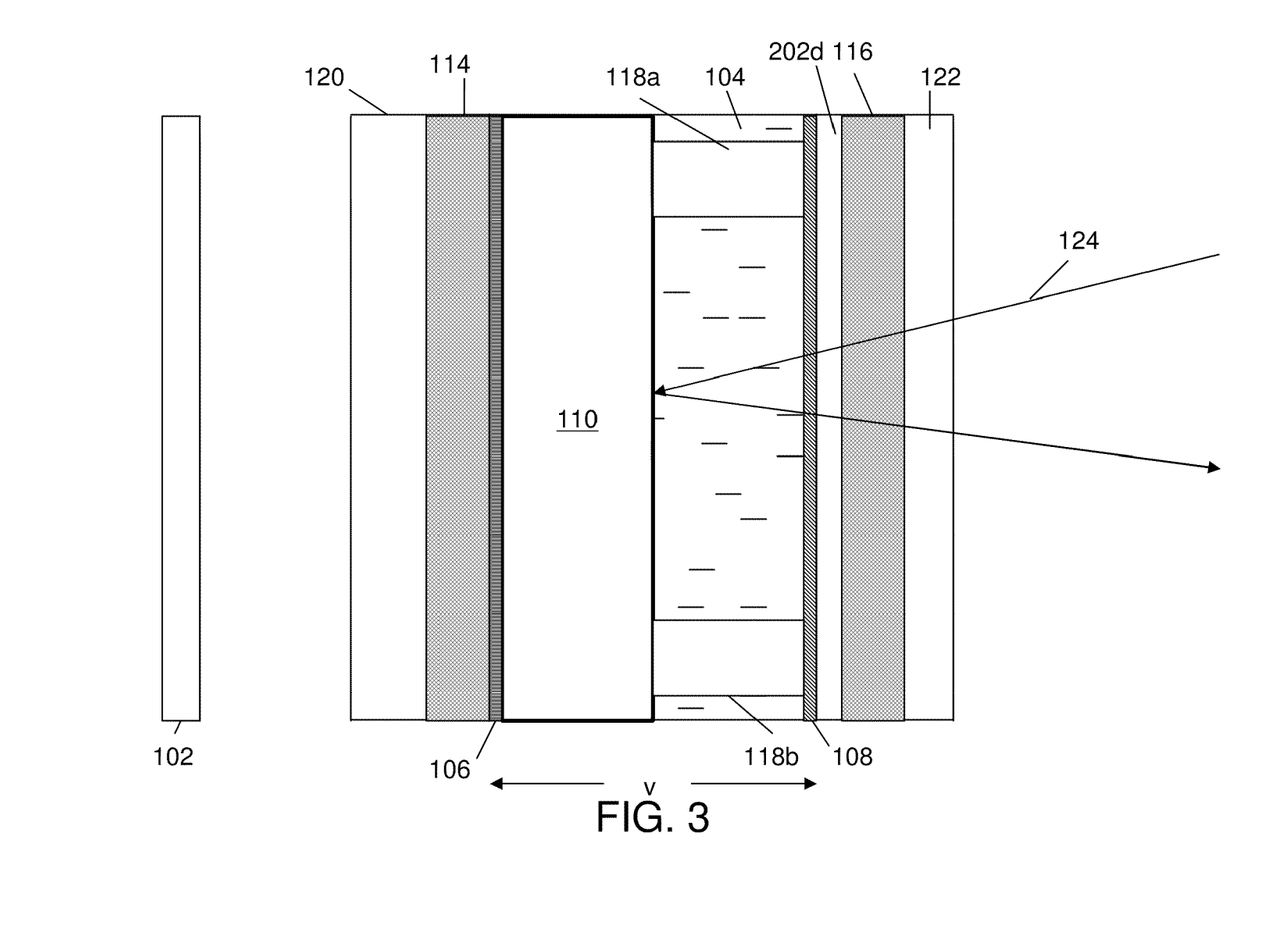
FIG. 3 illustrates the functioning of the LCD in a monochrome reflective mode.

FIG. 3 illustrates the functioning of pixel 100 in the monochrome reflective mode. Since the monochrome reflective embodiment is explained with reference to FIG. 3, only reflective part 110 is shown in the figure. Pixel 100 can be used in the monochrome reflective mode in the presence of an external source of light. In an embodiment, ambient light 124 passes through colorless filter 202d, and liquid crystal material 104 and is incident on reflective part 110. Colorless filter 202d is used to maintain the attenuation and the path difference of ambient light 124 the same as the attenuation and the path difference of the light in the color transmissive mode. The colorless color filter 202d can also be omitted by modifying the design. Reflective part 110 of pixel 100 reflects ambient light 124 to substrate 116. In an embodiment, a potential difference (v) is applied to pixel electrode 106, which is electronically coupled to the reflective part 110 and common electrode 108. Liquid crystal material 104 is oriented, depending on the potential difference (v). Consequently, the orientation of liquid crystal material 104 rotates the plane of ambient light 124, allowing the light to pass through second polarizer 122. The degree of orientation of liquid crystal material 104 therefore determines the brightness of pixel 100 and consequently, the luminance of pixel 100.

In an embodiment, a normally white liquid crystal embodiment can be employed in pixel 100. In this embodiment, axes of first polarizer 120 and second polarizer 122 are parallel to each other. The maximum threshold voltage is applied across pixel electrode 106, and common electrode 108 to block the light reflected by reflective part 110. Pixel 100 therefore appears black. Alternatively, a normally black liquid crystal embodiment can be used. In this embodiment, axes of first polarizer 120 and second polarizer 122 are perpendicular to each other. The maximum threshold voltage is applied across pixel electrode 106, and common electrode 108 to illuminate pixel 100.

Figure 4:
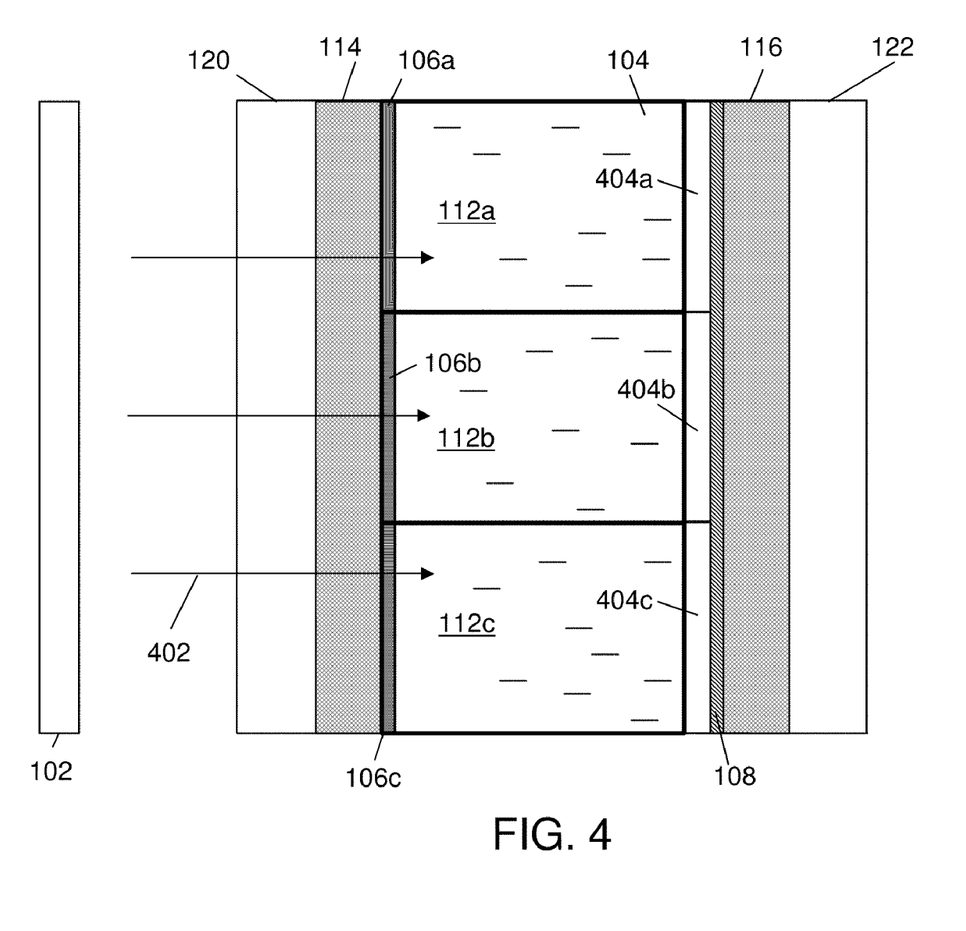
FIG. 4 illustrates the functioning of the LCD in a color transmissive mode by using a partial color filtered approach.

FIG. 4 illustrates the functioning of the LCD in the color transmissive mode by using a partial color filtered approach. Since the color transmissive embodiment is being explained, only transmissive parts of the pixel: 112a-c are shown in FIG. 4. On substrate 116, color filters 404a, 404b and 404c are respectively placed in transmissive pixel parts 112a, 112b and 112c, as shown in FIG. 4. Pixel parts 112a, 112b and 112c refer to the pixel optical value. Part 112a has optical contributions from part 102, 402, 120, 114, 106a, 104, 404a 108, 116 and 122. Part 112b has optical contributions from part 102, 402, 120, 114, 106b, 104, 404b, 108, 116, and 122. Part 112c has optical contributions from part 102, 402. 120, 114, 106c, 104, 404c, 108, 116, and 122. Color filters 404a, 404b, and 404c are also spread partially over the reflective area of the pixel. In various embodiments, the color filters cover any amount that is less than half the reflective area of the pixel (e.g., 1% to 50% of the area) and in one particular embodiment the color filters cover about 14% to 18% of the area.

Light source 102 is a standard backlight source. Light 402 from light source 102 can be collimated by using a collimating light guide or lens. In an embodiment, light 402, coming from light source 102, is passed through first polarizer 120. This aligns the plane of light 402 in a particular plane. In an embodiment, the plane of light 402 is aligned in the horizontal direction. Additionally, second polarizer 122 has an axis of polarization in the vertical direction. Transmissive parts 112a-c transmit light 402. In an embodiment, each of transmissive parts 112a-c has an individual switching element. The switching element controls the intensity of light 402 passing through the corresponding transmissive part. Further, light 402, after transmitting through transmissive parts 112a-c, passes through liquid crystal material 104. Transmissive parts 112a, 112b, and 112c are provided with pixel electrodes 106a-c respectively. The potential differences applied between pixel electrode 106a-c, and common electrode 108 determine the orientation of liquid crystal material 104. The orientation of liquid crystal material 104, in turn, determines the intensity of light 402 incident on each color filter 404a-c.

In an embodiment, a green color filter 404a is placed mostly or completely over transmissive part 112a and partially the reflective portion 110 (shown in FIGS. 2 and 3), a blue color filter 404b is placed mostly or completely over transmissive part 112b and partially over the reflective portion 110 (shown in FIGS. 2 and 3) and a red color filter 404c is placed mostly or completely over transmissive part 112c and partially over the reflective part 110 (shown in FIGS. 2 and 3). Each of color filters 404a-c imparts the corresponding color to the color pixel. The colors imparted by color filters 404a-c determine the chrominance value of the color pixel. Chrominance contains the color information such as hue and saturation for a pixel. Further, if there is ambient light 124, the light reflected by reflective part 110 (shown in FIGS. 2 and 3) provides luminance to the color pixel and imparts a monochrome adjustment to the white reflectance of the pixel which can compensate for the greenish look of the LC mode. This luminance therefore increases the resolution in the color transmissive mode. Luminance is a measure of the brightness of a pixel.

Figure 5:
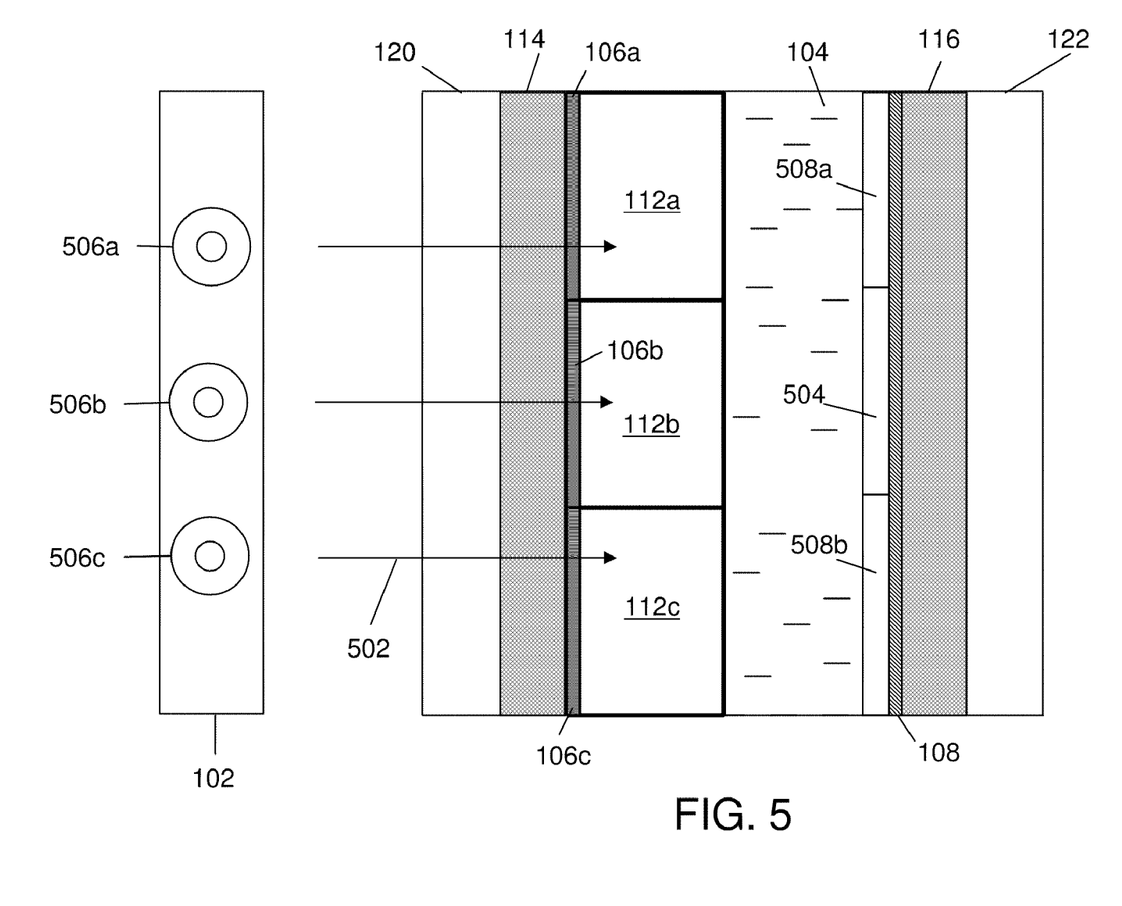
FIG. 5 illustrates the functioning of the LCD in a color transmissive mode by using a hybrid field sequential approach.

FIG. 5 illustrates the functioning of the LCD in the color transmissive mode by using a hybrid field sequential approach, in accordance with various embodiments. Since the color transmissive embodiment is being explained, only transmissive parts 112a-c are shown in FIG. 5. In an embodiment, light source 102 comprises strips of LEDs such as LED group 1, LED group 2 and so on (not shown). In an embodiment, the LEDs that are arranged horizontally are grouped together, one LED group below the other, to illuminate the LCD. Alternatively, the LEDs that are arranged vertically can be grouped. The LEDs groups are illuminated in a sequential manner. The frequency of illumination of an LED group can be between 30 frames to 540 frames per second. In an embodiment, each LED group comprises red LEDs 506a, white LEDs 506b and blue LEDs 506c. Further, red LEDs 506a and white LEDs 506b of LED group 1 are on from time t=0 to t=5 and red LEDs 506a and white LEDs 506b of LED group 2 are on from time t=1 to t=6. Similarly, all the red and white LEDs of other LED groups function in a sequential manner. In an embodiment, each LED group illuminates a horizontal row of pixels of the LCD, in case the LED groups are arranged vertically. Similarly blue LEDs 506c and white LEDs 506b of LED group 1 are on from time t=5 to t=10, and blue LEDs 506c and white LEDs 506b of LED group 2 are on from time t=6 to t=11. Similarly, all the blue and white LEDs of other LED groups are on in a sequential manner. Red LEDs 506a, white LEDs 506b and blue LEDs 506b are arranged so that red LEDs 506a and blue LEDs 506b illuminate transmissive parts 112a and 112c and white LEDs 506b illuminate transmissive part 112b. In another embodiment, the LED groups may comprise red, green and blue LEDs. Red, green and blue LEDs are so arranged that green LEDs illuminate transmissive part 112b and red and blue LEDs illuminate transmissive parts 112a and 112c, respectively.

In an embodiment, light 502 from light source 102 is passed through first polarizer 120. First polarizer 120 aligns the plane of light 502 in a particular plane. In an embodiment, the plane of light 502 is aligned in a horizontal direction. Additionally, second polarizer 122 has the axis of polarization in the vertical direction. Transmissive parts 112a-c transmit light 502. In an embodiment, each of transmissive parts 112a-c has an individual switching element. Further, switching elements control the intensity of light passing through each of transmissive parts 112a-c, thereby controlling the intensity of the color component. Further, light 502, after passing through transmissive parts 112a-c, passes through liquid crystal material 104. Each of transmissive parts 112a-c has its own pixel electrode 106a-c respectively. The potential differences applied between pixel electrodes 106a-c, and common electrode 108 determines the orientation of liquid crystal material 104. In the embodiment in which red, white, and blue LEDs are used, the orientation of liquid crystal material 104, in turn, determines the intensity of light 502 incident on a green color filter 504, and transparent spacers 508a and 508b. The intensity of light 502 passing though green filter 504, and transparent spacers 508a and 508b determines the chrominance value of the color pixel. In an embodiment, green color filter 504, is placed corresponding to transmissive part 112b. Transmissive part 112a and 112c do not have a color filter. Alternatively, transmissive parts 112a and 112c can use transparent spacers 508a and 508b respectively. Green color filter 504, transparent spacers 508a and 508b are located on substrate 116. In another embodiment, magenta color filters can be placed over transparent spacers 508a and 508b. In an embodiment, during time t=0 to t=5, when red LED 506a and white LED 506b are on, transmissive parts 112a and 112c are red and green filter 504 imparts a green color to transmissive part 112b. Similarly, during time t=6 to t=11, when blue LED 506c and white LEDs 506b are on, transmissive parts 112a and 112c are blue, and green filter 504 imparts a green color to transmissive part 112b. The color imparted to the color pixel is formed by the combination of colors from transmissive parts 112a-c. Further, if ambient light 124 is available, the light reflected by reflective part 110 (shown in FIGS. 2 and 3) provides luminance to the color pixel. This luminance therefore increases the resolution in the color transmissive mode.

Figure 6:
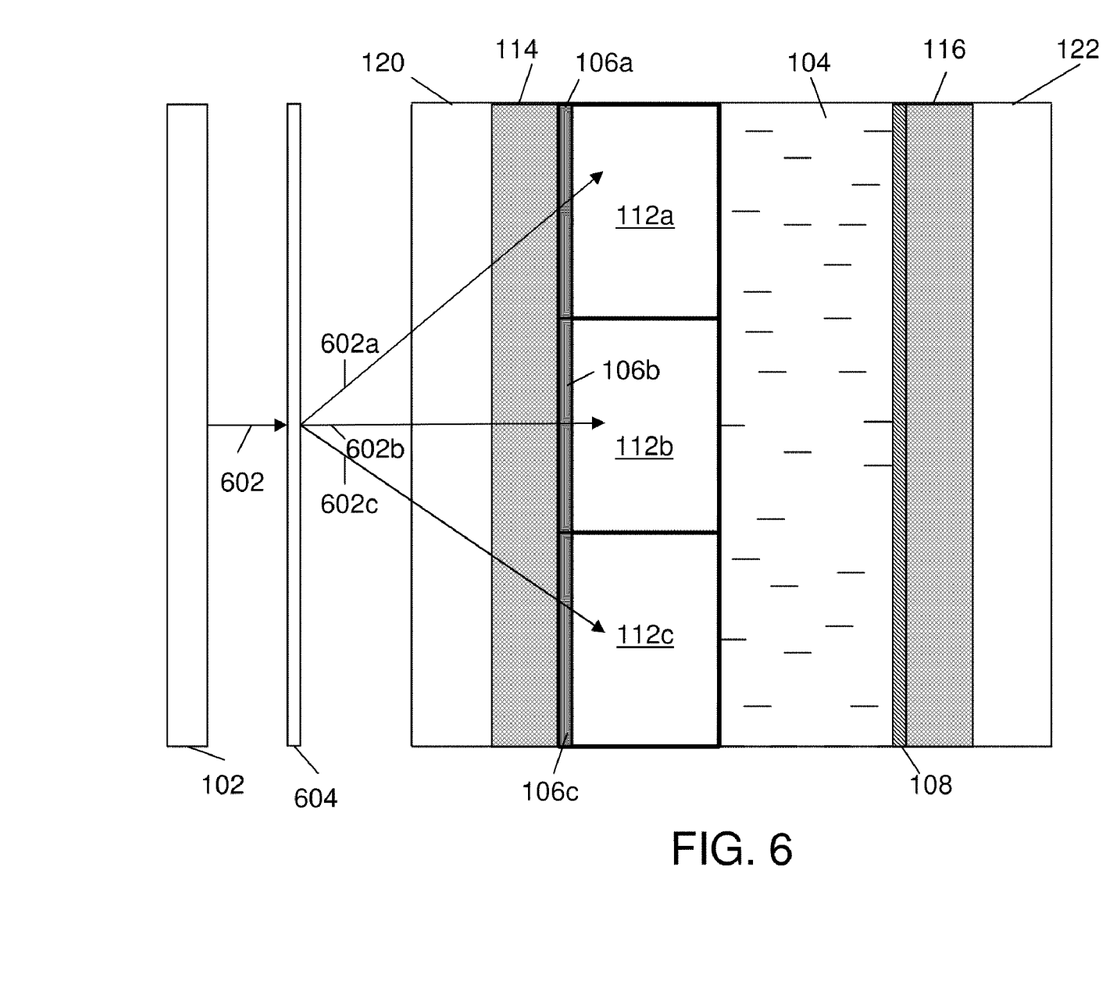
FIG. 6 illustrates the functioning of the LCD in a color transmissive mode by using a diffractive approach.

FIG. 6 illustrates the functioning of the LCD in the color transmissive mode by using a diffractive approach. Since the color transmissive embodiment is being explained, only transmissive parts 112a-c are shown in FIG. 6. Light source 102 can be a standard backlight source. In an embodiment, light 602 from light source 102 is split into a green component 602a, a blue component 602b and a red component 602c by using a diffraction grating 604. Alternatively, light 602 can be split into a spectrum of colors with a different part of the spectrum going through each of transmissive parts 112a-c using a micro-optical structure. In an embodiment, the micro-optical structure is a flat film optical structure with small lensets that can be stamped or imparted into the film. Green component 602a, blue component 602b and red component 602c are directed to transmissive parts 112a, 112b and 112c, respectively, using diffraction grating 604. Further, the components of light 602 are passed through first polarizer 120. This aligns the plane of light components 602a-c in a particular plane. In an embodiment, the plane of light components 602a-c is aligned in the horizontal direction. Additionally, second polarizer 122 has its axis of polarization in the vertical direction. Transmissive parts 112a-c allow light components 602a-c to be transmitted through them. In an embodiment, each of transmissive parts 112a-c has an individual switching element. Switching elements control the intensity of light passing through each of transmissive parts 112a-c, thereby controlling the intensity of the color component. Further, light components 602a-c, after passing through transmissive parts 112a-c, passes through liquid crystal material 104. Transmissive parts 112a, 112b and 112c respectively have pixel electrodes 106a, 106b and 106c. The potential differences applied between pixel electrodes 106a-c, and common electrode 108 determines the orientation of liquid crystal material 104. The orientation of liquid crystal material 104, in turn, determines the intensity of light components 602a-c passing through second polarizer 122. The intensity of color components passing through second polarizer 122 in turn decides the chrominance of the color pixel. Further, if ambient light is available, the light reflected by reflective part 110 (shown in FIGS. 2 and 3) provides luminance to the color pixel. This luminance therefore increases the resolution in the color transmissive mode.

As presented herein, transmissive part of the pixel is arranged diagonally rather than vertically or horizontally, as in the case of prior known LCDs. The diagonal arrangement of the transmissive part increases the resolution, as compared to prior known LCDs and therefore provides a better display.

Additionally, the presence of ambient light enhances the luminance of the color pixel in the color transmissive mode. Therefore, each pixel has both luminance and chrominance. This increases the resolution of the LCD. Consequently, the number of pixels required for a particular resolution is lower than in prior known LCDs, thereby decreasing the power consumption of the LCD. Further, a Transistor-Transistor Logic (TTL) based interface can be used that lowers the power consumption of the LCD as compared to the power consumed by the interfaces used in prior known LCDs. Additionally, because the timing controller stores the signals related to pixel values, the LCD is optimized for using the self refresh property, thereby decreasing the power consumption. In various embodiments, thinner color filters which transmit less saturated color and more light can be used. Hence, various embodiments facilitate the process of reducing the power consumption, as compared to prior known LCDs.

Further, in an embodiment (described in FIG. 5), green or white color light is always visible on pixel 100, and only the red and blue color lights are switched. Therefore, a lower frame rate is required as compared to the frame rate of prior known field sequential displays.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention, as described in the claims.

What is claimed is:

1. A multi-mode Liquid Crystal display, comprising:
a light source for illuminating the multi-mode display;
a first polarizer for aligning the plane of polarization of light from the light source to a first plane;
a second polarizer for aligning the plane of polarization of the light from the light source to a pre-defined second plane;

a first substrate and a second substrate, the first substrate and the second substrate being interposed between the first polarizer and the second polarizer; and a plurality of pixels, each of the plurality of pixels being positioned at the first substrate, each of the plurality of pixels comprising a reflective part and a transmissive part, wherein the reflective part has only part of a color filter, and at least part of the transmissive part comprises one or more color-filters that mostly or completely cover the transmissive part of the pixel;

wherein the reflective part is configured for monochrome reflectance;

wherein the reflective part comprises a first reflective area covered with the color filter and a second reflective area not covered with the color filter, and wherein the first reflective area is smaller than the second reflective area.

2. The multi-mode Liquid Crystal Display according to claim 1, wherein the reflective part occupies opposite corners of the plurality of pixels.

3. The multi-mode Liquid Crystal Display according to claim 1, wherein the color filter associated with the reflective part of the pixel creates a monochrome white point for the entire pixel.

4. The multi-mode Liquid Crystal Display according to claim 1, wherein the transmissive part occupies a center of the plurality of pixels.

5. The multi-mode Liquid Crystal Display according to claim 1, wherein a spectrum of color is generated from the light from the light source using a diffractive or a micro-optical film.

6. The multi-mode Liquid Crystal Display according to claim 1, wherein the transmissive part is diagonally arranged.

7. The multi-mode Liquid Crystal Display according to claim 1, wherein the one or more color-filters are of different thicknesses.

8. The multi-mode Liquid Crystal Display according to claim 1, wherein the one or more color-filters are of a same thickness.

9. The multi-mode Liquid Crystal Display according to claim 1 further comprising one or more colorless spacers placed over the reflective part.

10. The multi-mode Liquid Crystal Display according to claim 9 wherein the one or more colorless spacers are of a same thickness.

11. The multi-mode Liquid Crystal Display according to claim 1 wherein the one or more colorless spacers are of different thicknesses.

12. The multi-mode Liquid Crystal Display according to claim 1 further comprising a driver circuit to provide pixel values to a plurality of switching elements, wherein the plurality of switching elements determines the light transmitting through the transmissive part.

13. The multi-mode Liquid Crystal Display according to claim 12, wherein the driver circuit further comprises a Transistor-Transistor-Logic interface.

14. The multi-mode Liquid Crystal Display according to claim 12 further comprising a timing control circuit to refresh the pixel values of the multi-mode Liquid Crystal Display.

15. The multi-mode Liquid Crystal Display according to claim 12 wherein 1% to 50% of the reflective part has a color filter.

16. A computer, comprising:

one or more processors;

a multi-mode Liquid Crystal display coupled to the one or more processors and comprising a light source for illuminating the multi-mode display; a first polarizer for aligning the plane of polarization of light from the light source to a first plane; a second polarizer for aligning the plane of polarization of the light from the light source to a pre-defined second plane; a first substrate and a second substrate, the first substrate and the second substrate being interposed between the first polarizer and the second polarizer; and a plurality of pixels, each of the plurality of pixels being positioned at the first substrate, each of the plurality of pixels comprising a reflective part and a transmissive part, wherein the reflective part has only part of a color filter, and at least part of the transmissive part comprises one or more color-filters that mostly or completely cover the transmissive part of the pixel;

wherein the reflective part is configured for monochrome reflectance;

wherein the reflective part comprises a first reflective area covered with the color filter and a second reflective area not covered with the color filter, and wherein the first reflective area is smaller than the second reflective area.

17. The computer of claim 16, wherein the reflective part occupies opposite corners of the plurality of pixels.

18. The computer of claim 16, wherein the color filter associated with the reflective part of the pixel creates a monochrome white point for the entire pixel.

19. The computer of claim 16, wherein the transmissive part occupies a center of the plurality of pixels.

20. The computer of claim 16, wherein a spectrum of color is generated from the light from the light source using a diffractive or a micro-optical film.

21. The computer of claim 16, wherein the transmissive part is diagonally arranged.

22. A multi-mode Liquid Crystal Display comprising a plurality of pixels, each of the plurality of pixels being positioned at a first substrate, each of the plurality of pixels comprising a reflective part and a transmissive part, wherein a first color filter is over only part of the reflective part, and the transmissive part comprises one or more second color-filters that mostly or completely cover the transmissive part of the pixel;

wherein the reflective part is configured for monochrome reflectance;

wherein the reflective part comprises a first reflective area covered with the color filter and a second reflective area not covered with the color filter, and wherein the first reflective area is smaller than the second reflective area.

* * * * *